United States Patent
Ward et al.

(10) Patent No.: US 9,852,666 B2
(45) Date of Patent: *Dec. 26, 2017

(54) FULL HEIGHT SECTIONAL SIGN ASSEMBLY AND INSTALLATION KIT AND METHOD OF USING SAME

(71) Applicant: ADTI MEDIA, LLC, Temecula, CA (US)

(72) Inventors: Darren Robert Ward, Temecula, CA (US); David Franklin Cox, Escondido, CA (US); Richard J. Romano, Temecula, CA (US); Arne E. Carlson, Ramona, CA (US)

(73) Assignee: ADTI Media LLC, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,002

(22) Filed: Apr. 17, 2016

(65) Prior Publication Data
US 2016/0232822 A1   Aug. 11, 2016

Related U.S. Application Data

(63) Continuation-in-part of application No. 13/844,832, filed on Mar. 16, 2013, now Pat. No. 9,330,583.
(Continued)

(51) Int. Cl.
G09F 9/302   (2006.01)
H04N 5/63   (2006.01)
G09G 3/32   (2016.01)

(52) U.S. Cl.
CPC ............. *G09F 9/3026* (2013.01); *H04N 5/63* (2013.01); *G09G 3/32* (2013.01);
(Continued)

(58) Field of Classification Search
CPC .......... G09F 9/3026; G09G 3/32; H04N 5/63
(Continued)

(56) References Cited

U.S. PATENT DOCUMENTS

| 4,457,090 | A |   | 7/1984 | McDonough |
| 5,214,572 | A | * | 5/1993 | Cosimano ............... G06F 1/184 |
|           |   |   |        | 211/41.17 |

(Continued)

FOREIGN PATENT DOCUMENTS

| EP | 0863496 | 3/1997 |
| EP | 2042983 | 8/2010 |

(Continued)

*Primary Examiner* — Tuan T Dinh
*Assistant Examiner* — Mukund G Patel
(74) *Attorney, Agent, or Firm* — James R. McDaniel; Jerry R. Potts

(57) ABSTRACT

A modification kit for converting an existing signage mounting structure to an electronic sign generally includes at least one sectional sign assembly including a frame section having a back-facing portion configured to be coupled to the existing signage mounting structure and a front-facing portion including an array of bays, each individual bay having removably mounted therein an LED display module and being prewired with a power routing system; wherein the power routing system includes an input end that branches out to a plurality of output ends, each disposed in one of the bays and each configured to directly couple to one of the LED display modules; a power kit configured to couple the input end of each power routing system to an AC power source; and an installation kit configured to facilitate mounting said back-facing portion to the existing signage mounting structure.

15 Claims, 12 Drawing Sheets

Related U.S. Application Data

(60) Provisional application No. 62/156,653, filed on May 4, 2015.

(52) U.S. Cl.
CPC ... *G09G 2300/026* (2013.01); *G09G 2380/06* (2013.01); *Y10T 29/49117* (2015.01)

(58) Field of Classification Search
USPC .................................................. 361/679.56
See application file for complete search history.

(56) References Cited

U.S. PATENT DOCUMENTS

| | | | |
|---|---|---|---|
| 5,410,328 A | 4/1995 | Yoksza et al. | |
| 5,563,470 A | 10/1996 | Li | |
| 5,693,170 A | 12/1997 | Li | |
| 5,785,415 A | 7/1998 | Matsumura et al. | |
| 5,949,581 A | 9/1999 | Kurtenbach et al. | |
| 5,990,802 A | 11/1999 | Maskeny | |
| 6,065,854 A | 5/2000 | West et al. | |
| 6,150,996 A | 11/2000 | Nicholson et al. | |
| 6,169,632 B1 | 1/2001 | Kurtenbach et al. | |
| 6,175,342 B1 | 1/2001 | Nicholson et al. | |
| 6,237,290 B1 | 5/2001 | Tokimoto et al. | |
| 6,314,669 B1 * | 11/2001 | Tucker | G09F 9/33 340/815.45 |
| 6,414,650 B1 | 7/2002 | Nicholson et al. | |
| 6,445,373 B1 | 9/2002 | Yamamoto | |
| 6,634,124 B1 | 10/2003 | Bierschbach | |
| 6,657,605 B1 | 12/2003 | Boldt, Jr. et al. | |
| 6,677,918 B2 | 1/2004 | Yuhara et al. | |
| 6,741,222 B1 | 5/2004 | Tucker | |
| 6,810,612 B2 | 11/2004 | Huang | |
| 6,813,853 B1 | 11/2004 | Tucker | |
| 6,956,541 B2 | 10/2005 | McClntock | |
| 6,956,545 B2 | 10/2005 | McClntock et al. | |
| 7,055,271 B2 | 6/2006 | Tsao | |
| 7,064,674 B2 | 6/2006 | Pederson | |
| 7,091,933 B2 | 11/2006 | McClntock | |
| 7,131,226 B2 | 11/2006 | Gray et al. | |
| 7,138,659 B2 | 11/2006 | Raos et al. | |
| 7,144,748 B2 | 12/2006 | Popovich | |
| 7,170,480 B2 | 1/2007 | Boldt, Jr. et al. | |
| 7,207,693 B2 | 4/2007 | Ratcliffe | |
| 7,224,347 B2 | 5/2007 | Martin et al. | |
| 7,284,881 B2 | 10/2007 | Kim et al. | |
| 7,287,878 B2 | 10/2007 | Miller | |
| 7,315,049 B2 | 1/2008 | Raos et al. | |
| 7,334,361 B2 | 2/2008 | Schrimpf et al. | |
| 7,355,562 B2 | 4/2008 | Schubert et al. | |
| 7,450,085 B2 | 11/2008 | Thielemans et al. | |
| 7,473,020 B2 | 1/2009 | Pickering | |
| 7,498,933 B2 | 3/2009 | Pederson | |
| 7,543,976 B2 | 6/2009 | Abogabir | |
| 7,576,707 B2 | 8/2009 | Nishimura | |
| 7,605,772 B2 | 10/2009 | Syrstad | |
| 7,612,736 B2 | 11/2009 | Nakajima | |
| 7,614,771 B2 | 11/2009 | McKechnie et al. | |
| 7,665,874 B2 | 2/2010 | Chadwell | |
| 7,682,043 B2 | 3/2010 | Malstrom et al. | |
| 7,688,280 B2 | 3/2010 | Callegari et al. | |
| 7,694,444 B2 | 4/2010 | Miller | |
| 7,703,941 B2 | 4/2010 | Lee | |
| 7,774,968 B2 | 8/2010 | Nearman et al. | |
| 7,779,568 B2 | 8/2010 | Gettelfinger et al. | |
| 7,797,865 B2 | 9/2010 | Patel et al. | |
| 7,823,308 B1 * | 11/2010 | Munson | H05K 5/04 345/1.1 |
| 7,868,903 B2 | 1/2011 | Wendler et al. | |
| 7,869,198 B1 | 1/2011 | Nearman et al. | |
| 7,926,213 B1 | 4/2011 | Kludt et al. | |
| 7,928,968 B2 | 4/2011 | Shon et al. | |
| 7,950,174 B2 | 5/2011 | Xu | |
| 7,971,378 B2 | 7/2011 | Sergio Campo y Odena | |
| 8,007,121 B2 | 8/2011 | Elliott et al. | |
| 8,016,452 B2 | 9/2011 | Dunn | |
| 8,066,403 B2 | 11/2011 | Sanfilippo et al. | |
| 8,074,387 B2 | 12/2011 | Mancuso | |
| 8,104,204 B1 | 1/2012 | Syrstad et al. | |
| 8,111,208 B2 | 2/2012 | Brown | |
| 8,154,864 B1 | 4/2012 | Nearman | |
| 8,156,672 B2 | 4/2012 | Xu | |
| 8,172,097 B2 | 5/2012 | Nearman et al. | |
| 8,183,794 B2 | 5/2012 | Grajcar | |
| 8,228,261 B2 | 7/2012 | Callegari et al. | |
| 8,246,220 B2 | 8/2012 | Epstein et al. | |
| 8,269,700 B2 | 9/2012 | Joffer et al. | |
| 8,344,410 B2 | 1/2013 | Wendler et al. | |
| 8,350,788 B1 | 1/2013 | Nearman et al. | |
| 8,362,696 B2 | 1/2013 | Zheng | |
| D681,263 S | 4/2013 | Van Eekeren et al. | |
| 8,414,149 B2 | 4/2013 | Nearman et al. | |
| 8,434,898 B2 | 5/2013 | Sanfilippo et al. | |
| 8,558,755 B2 | 10/2013 | Kharrati et al. | |
| 8,599,108 B2 | 12/2013 | Kline et al. | |
| 8,604,509 B2 | 12/2013 | Wendler et al. | |
| 2001/0037591 A1 | 11/2001 | Nicholson et al. | |
| 2002/0122134 A1 | 9/2002 | Kalua | |
| 2003/0058191 A1 | 3/2003 | Yuhara et al. | |
| 2003/0210236 A1 | 11/2003 | Martin et al. | |
| 2004/0040248 A1 | 3/2004 | Vilnes | |
| 2004/0104871 A1 | 6/2004 | Boldt, Jr. et al. | |
| 2004/0123501 A1 | 7/2004 | Safavi et al. | |
| 2005/0081414 A1 | 4/2005 | Lutz et al. | |
| 2005/0151708 A1 | 7/2005 | Farmer et al. | |
| 2005/0178034 A1 | 8/2005 | Schubert et al. | |
| 2005/0212717 A1 | 9/2005 | Baumstark | |
| 2005/0231949 A1 | 10/2005 | Kim et al. | |
| 2005/0259036 A1 | 11/2005 | Callegari et al. | |
| 2005/0259418 A1 | 11/2005 | Callegari et al. | |
| 2006/0055641 A1 | 3/2006 | Robertus et al. | |
| 2006/0056169 A1 | 3/2006 | Lodhie et al. | |
| 2006/0171148 A1 | 8/2006 | Huang | |
| 2006/0244681 A1 | 11/2006 | Nakajima | |
| 2006/0254103 A1 | 11/2006 | Strick et al. | |
| 2006/0279493 A1 | 12/2006 | Syrstad | |
| 2007/0000849 A1 | 1/2007 | Lutz et al. | |
| 2007/0008259 A1 | 1/2007 | Baker | |
| 2007/0068055 A1 | 3/2007 | Segan et al. | |
| 2007/0081341 A1 | 4/2007 | Raos et al. | |
| 2007/0086187 A1 | 4/2007 | Raos et al. | |
| 2007/0086188 A1 | 4/2007 | Raos et al. | |
| 2007/0086189 A1 | 4/2007 | Raos et al. | |
| 2008/0130282 A1 | 6/2008 | Negley | |
| 2008/0141571 A1 | 6/2008 | Kowittz | |
| 2008/0141572 A1 | 6/2008 | Tomich et al. | |
| 2008/0263924 A1 | 10/2008 | Nearman et al. | |
| 2008/0266206 A1 | 10/2008 | Nelson et al. | |
| 2009/0009103 A1 | 1/2009 | McKchnie et al. | |
| 2009/0015997 A1 | 1/2009 | Barajas et al. | |
| 2009/0040137 A1 | 2/2009 | Callegari et al. | |
| 2009/0058760 A1 | 3/2009 | Aoki | |
| 2009/0128461 A1 | 5/2009 | Geldard et al. | |
| 2009/0146910 A1 | 6/2009 | Gardner | |
| 2009/0146918 A1 | 6/2009 | Kleine et al. | |
| 2009/0146919 A1 | 6/2009 | Kleine et al. | |
| 2009/0147028 A1 | 6/2009 | Sefton et al. | |
| 2009/0190353 A1 | 7/2009 | Barker | |
| 2009/0241388 A1 | 10/2009 | Dunn | |
| 2009/0284978 A1 | 11/2009 | Elliot et al. | |
| 2009/0289160 A1 | 11/2009 | Kludt et al. | |
| 2010/0195350 A1 | 1/2010 | Chang et al. | |
| 2010/0090934 A1 | 4/2010 | Elliot et al. | |
| 2010/0123732 A1 | 5/2010 | Jenks et al. | |
| 2010/0171686 A1 | 7/2010 | Callegari et al. | |
| 2010/0251525 A1 | 10/2010 | Brown et al. | |
| 2010/0309185 A1 | 12/2010 | Koester et al. | |
| 2011/0002129 A1 | 1/2011 | Zheng et al. | |
| 2011/0019414 A1 | 1/2011 | Jiang et al. | |
| 2011/0051409 A1 | 3/2011 | Nearman | |
| 2011/0057215 A1 | 3/2011 | Chen et al. | |
| 2011/0072697 A1 | 3/2011 | Miller | |
| 2011/0074833 A1 | 3/2011 | Murayama et al. | |

(56) References Cited

U.S. PATENT DOCUMENTS

| | | |
|---|---|---|
| 2011/0085321 A1 | 4/2011 | Eli |
| 2011/0089824 A1 | 4/2011 | Zheng |
| 2011/0090138 A1 | 4/2011 | Zheng |
| 2011/0102307 A1 | 5/2011 | Wendler |
| 2011/0116232 A1 | 5/2011 | Brown et al. |
| 2011/0133659 A1 | 6/2011 | Li et al. |
| 2011/0181495 A1 | 7/2011 | Chu |
| 2011/0188235 A1 | 8/2011 | Bollmann |
| 2011/0188981 A1 | 8/2011 | Bonn |
| 2011/0215992 A1 | 9/2011 | Kleine et al. |
| 2011/0219650 A1 | 9/2011 | Wright |
| 2011/0221662 A1 | 9/2011 | Klein et al. |
| 2011/0235332 A1 | 9/2011 | Cheung |
| 2012/0206277 A1 | 8/2012 | Cai |
| 2013/0298432 A1 | 11/2013 | Gatuslao |

FOREIGN PATENT DOCUMENTS

| | | |
|---|---|---|
| EP | 1534992 | 8/2012 |
| WO | WO2004042690 | 5/2003 |
| WO | WO2007083879 | 1/2006 |
| WO | WO2008015762 | 8/2006 |
| WO | WO2009008964 | 7/2007 |
| WO | WO2009008986 | 7/2007 |
| WO | WO2009064219 | 11/2007 |
| WO | WO2009104982 | 2/2008 |
| WO | WO2011059247 | 11/2009 |
| WO | WO2011162570 | 6/2010 |

\* cited by examiner

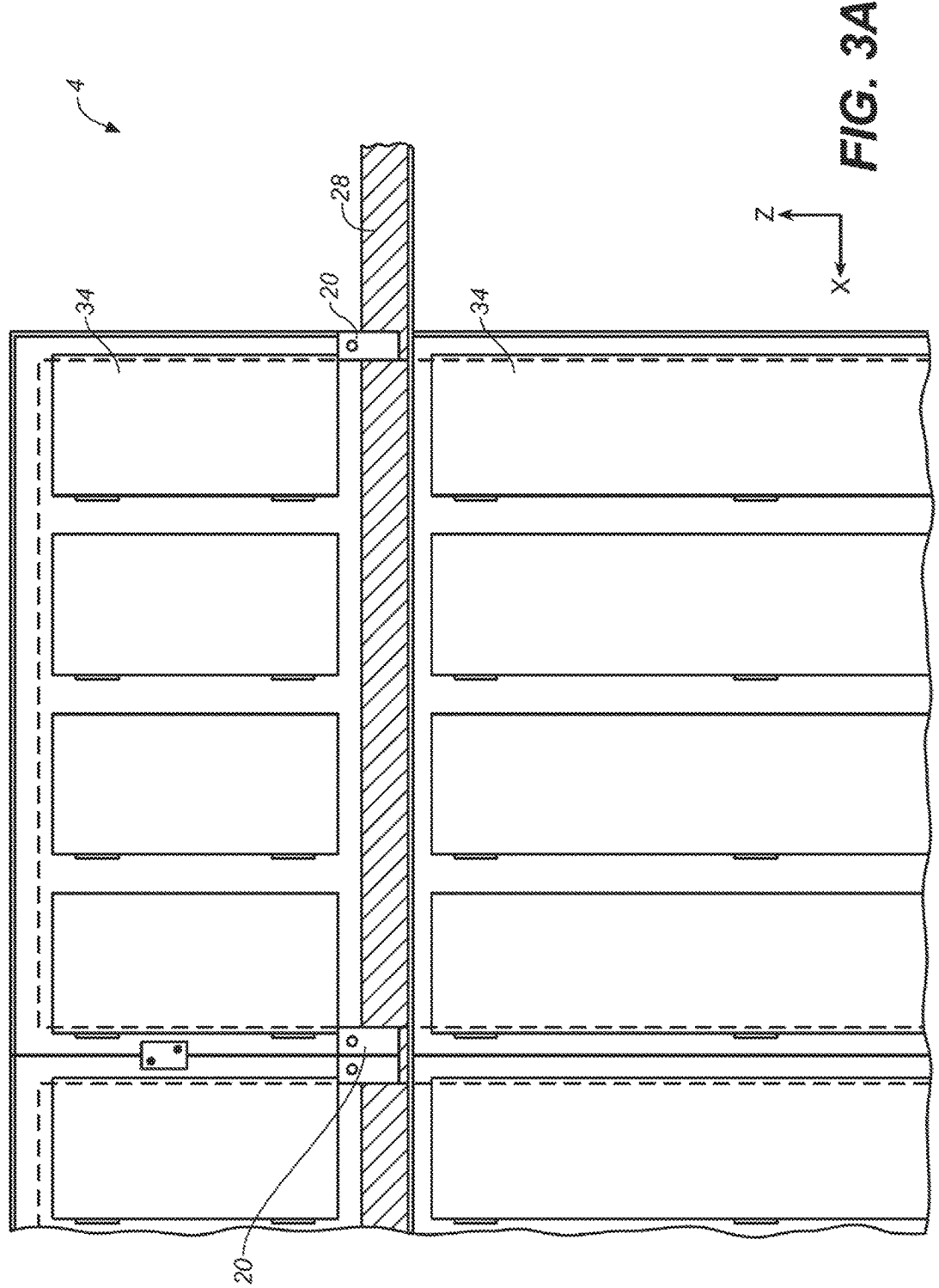

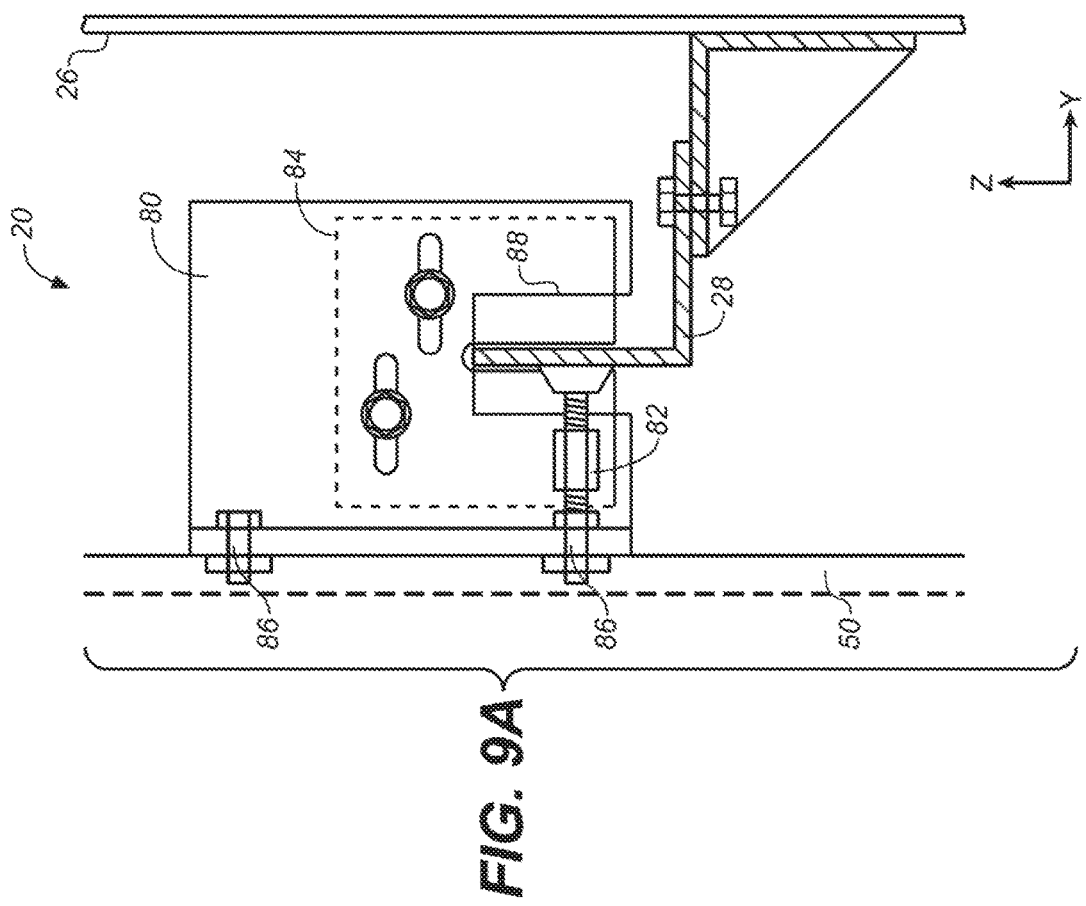
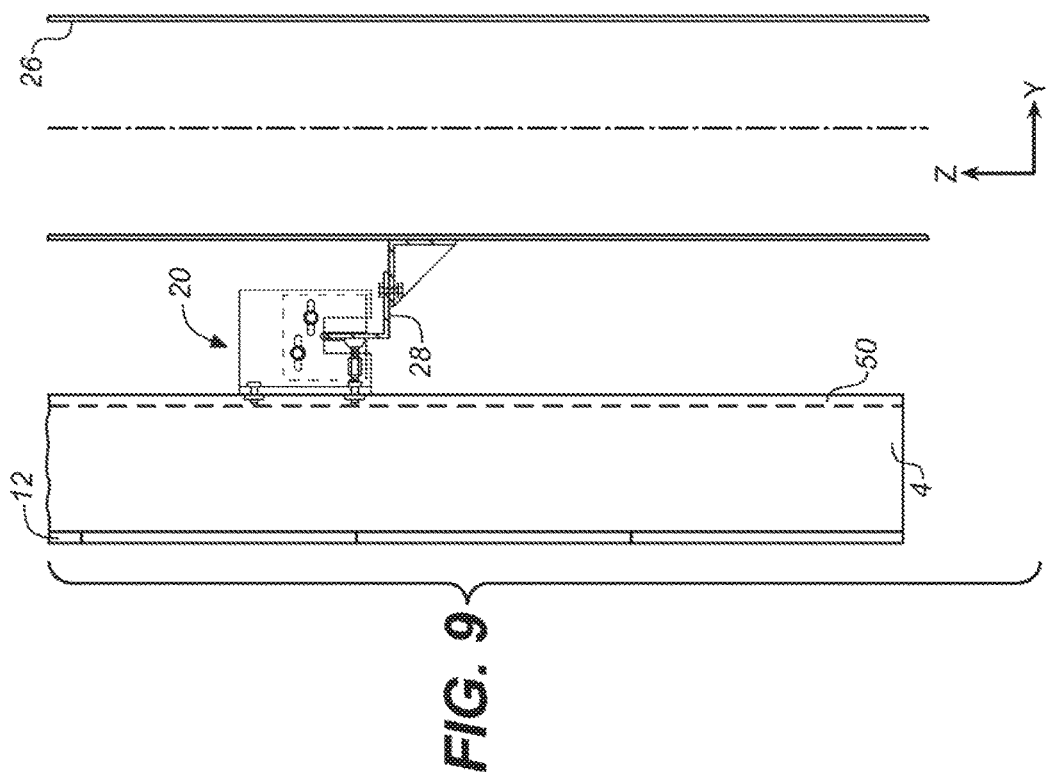

US 9,852,666 B2

FULL HEIGHT SECTIONAL SIGN ASSEMBLY AND INSTALLATION KIT AND METHOD OF USING SAME

RELATED APPLICATIONS

This application is a continuation-in-part of U.S. patent application Ser. No. 62/156,653 filed on May 4, 2015, entitled, "Full Height Sectional Sign Assembly and Installation Kit and Method of Using Same" and a continuation-in-part of U.S. patent application Ser. No. 13/844,832 filed on Mar. 16, 2013, entitled "In Field Kit for Converting a Non Electronic Billboard into an Electronic Billboard and Methods of Retrofitting and Using Same"; each of the above-mentioned applications is incorporated herein as thought fully set forth.

FIELD OF THE INVENTION

This invention generally relates to roadside and building signage, and more particularly to a retrofit kit for in field use to covert a static billboard into a dynamic electronic sign for roadside or building signage use.

BACKGROUND OF THE INVENTION

Roadside static billboards are a familiar sight. The term "static billboard" as defined herein will refer to billboards carrying printed images such as those generated via printing processes. Such printing processes can include screen printing or "grand format" inkjet printers. A typical static billboard includes a signage mounting structure supporting a panel for displaying the printed image. Printing, transporting, and mounting these billboard images can be time-consuming and expensive. Typically used for advertising, these posters need to be designed for long usage periods because of the time and expense to change the image.

There is a desire to more frequently change roadside signs. Being able to change a roadside sign once or more per day can be useful. For example, it may be advantageous to have a roadside sign advertising a lunch destination from late morning until around noon and then advertising a hotel destination in late afternoon.

More recently electronic digital signs have been implemented. These electronic signs typically have a large cabinet structure that supports an array of LED (light emitting diode) modules. Each LED module has an array of LEDS (light emitting diodes) that are energized to allow the array of LED modules to collectively display an image. The electronic sign can be programmed to display content that is optimal for the hour of the day or day of the week by electronically sending a desired image to the sign. Thus they have advantages over conventional poster boards.

The vast majority of roadside signs are legacy static billboards but there is a strong motivation to replace these with electronic digital signs. But taking down and completely replacing such large signs can be cost prohibitive. The large electronic sign cabinets need to be transported with special "wide load" trucks which is extremely expensive and hazardous to traffic. In addition the older hardware—the existing signage mounting structures—need to be taken down and perhaps disposed of. This can also be very expensive. Thus better solutions for the conversion of static billboard signs to digital electronic signs are being sought.

SUMMARY OF THE INVENTION

A first aspect of the present invention is a modification kit for converting an existing static billboard mounting structure to an electronic sign that generally comprises a plurality of display modules; and a plurality of frame sections wherein each individual frame section includes a front-facing portion, a rear-facing portion and a power routing system. The front-facing portion of each individual frame section provides a two dimensional array of bays, wherein each bay is configured for receiving an individual one of the plurality of display modules. The plurality of frame sections provide, in combination with the plurality of display modules a full height sectional sign assembly where the plurality of frame sections collectively define an array width of the electronic sign and the two dimensional array of bays collectively define an array height for the electronic sign.

In one embodiment of the first aspect of the present invention, the display modules of the modification kit are weatherized display modules.

In another embodiment of the first aspect of the present invention, the two dimensional array of bays is between one bay and six bays in height.

In yet another embodiment of the first aspect of the present invention, the two dimensional array of bays is between eight bays and fourteen bays in height.

In yet another embodiment of the first aspect of the present invention, each frame section is constructed from a framework of vertical and horizontal beams and an outer sheeting, the framework including an interior beam that supports a vertical routing of a power routing system to facilitate branching their output ends in a generally horizontal direction into each bay.

In still yet another embodiment of the first aspect of the present invention, each frame section is constructed from a framework of vertical and horizontal beams and an outer sheeting, the outer sheeting including a rear sheet on the rear-facing portion of a frame section, which rear sheet includes a door for removing and replacing at least one display module within the frame section array of bays.

In yet another embodiment of the first aspect of the present invention, a power kit is provided which includes a power hub for each frame section, wherein the power hub is configured to couple between an AC power source and to rectify the AC power source delivered to an input end of a power routing system.

In another embodiment of the first aspect of the present invention, the installation kit includes a mounting apparatus for each frame section; wherein the mounting apparatus is configured to couple the frame section to the existing signage mounting structure and to compensate for non-planarity of the existing signage mounting structure.

In yet another embodiment of the first aspect of the present invention, the installation kit includes an alignment and lifting apparatus configured to couple and align a group of frame sections and to provide an interface for a crane to hoist the group of frame sections to the existing signage mounting structure.

In still yet another embodiment of the first aspect of the present invention, at least some of the display modules are pre-installed in at least some of the frame sections.

In yet another embodiment of the first aspect of the present invention, when installed the installation kits provides an electronic sign.

In a second aspect the present invention is a modification kit for converting an existing signage mounting structure to an electronic sign comprising: at least one sectional sign assembly including a frame section having a back-facing portion configured to be coupled to the existing signage mounting structure and a front-facing portion including an array of bays, each individual bay having removably mounted therein an LED display module and being prewired with a power routing system; wherein the power routing system includes an input end that branches out to a plurality of output ends, each disposed in one of the bays and each configured to directly couple to one of the LED display modules; a power kit configured to couple the input end of each power routing system to an AC power source; and an installation kit configured to facilitate mounting said back-facing portion to the existing signage mounting structure.

In an embodiment of the second aspect of the present invention, the frame section includes a framework of outer vertical beams, outer horizontal beams and internal vertical beams for providing said at least one sectional sign assembly with mechanical strength.

In another embodiment of the second aspect of the present invention, some of the internal vertical beams facilitate the vertical routing of the prewired power routing system between pairs of bays in the array of bays.

In yet another embodiment of the second aspect of the present invention, each bay in said array of bays is defined by a front sheeting member, a rear sheeting member and a rear access door, wherein said outer vertical beams and said outer horizontal beams and said internal vertical beams cooperate to support the front sheeting member and the rear sheeting member associated with each individual bay.

In still yet another embodiment of the second aspect of the present invention, the rear access door allows rear removal and replacement of the LED display modules disposed in said frame section.

In yet another embodiment of the second aspect of the present invention, the front-facing portion of said frame section allows front removal and replacement of the LED display modules in said frame section.

In another embodiment of the second aspect of the present invention each outer vertical beam has a channel mounted thereto, said channel facilitating the mounting of the frame section to a horizontal beam forming part of the existing signage mounting structure.

In yet another embodiment of the second aspect of the present invention, each bay is provided with a pair of latch receiving openings and wherein each LED display module is provided with a latch mechanism that extends horizontally along an X-axis dimension thereof a sufficient distance to engage the latch receiving openings in an associated bay to facilitate removably latching the LED display module within the associated bay.

BRIEF DESCRIPTION OF THE DRAWINGS

The above mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 3A is a detailed view taken from detail indication 3A of FIG. 3;

FIG. 9 is a side elevational view of a sectional sign assembly mounted to a horizontal beam of an existing signage mounting structure using a mounting bracket forming part of the modification kit of FIG. 1;

FIG. 9A is an enlarged side elevational view of a portion of the sectional sign assembly of FIG. 9, illustrating mounting details.

DETAILED DESCRIPTION OF PREFERRED EMBODIMENTS

Figure 1:
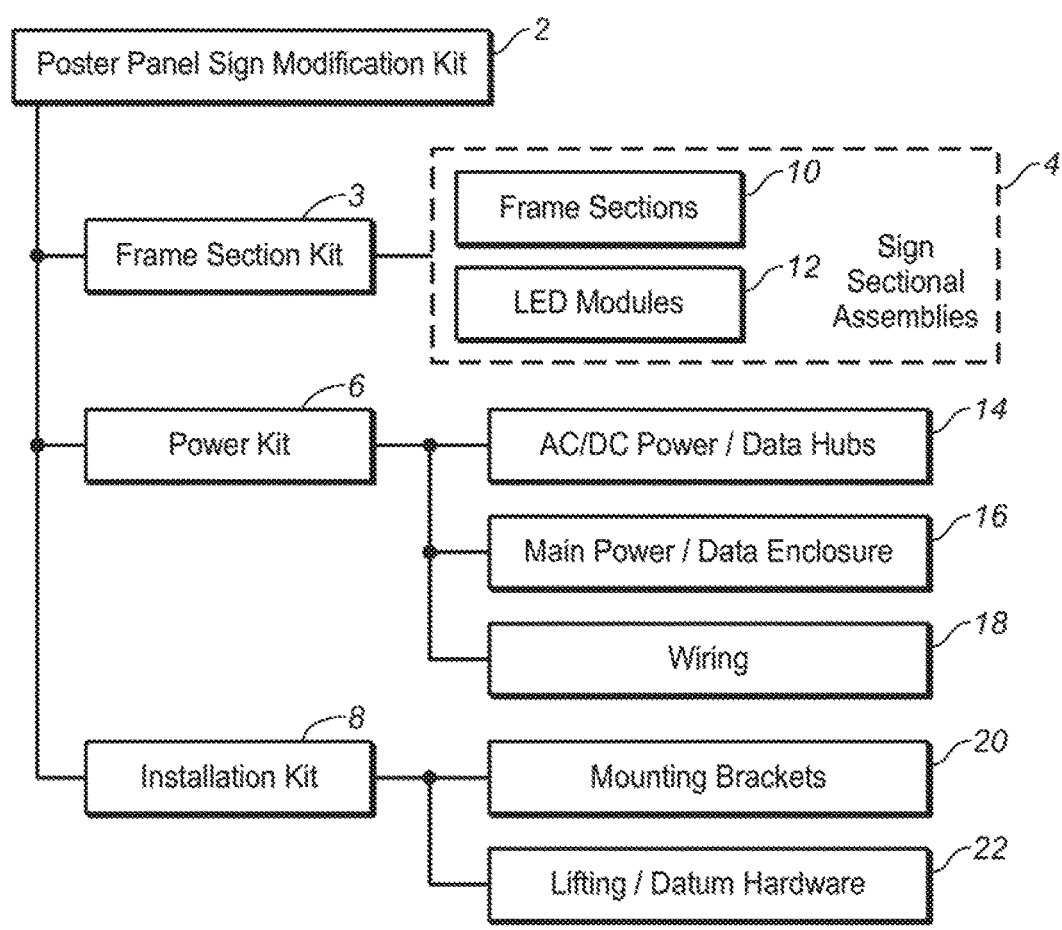
FIG. 1 is a block diagram representation of a poster panel modification or retrofit kit for converting an existing static billboard sign into a digital electronic sign, which modification kit is constructed in accordance with the present invention.

Referring now to the drawings and more particularly to FIG. 1, there is illustrated an exemplary static billboard sign modification or retrofit kit 2, which is constructed in accordance with the present invention. The retrofit kit 2 is for in field use to convert a static billboard or poster panel sign, which carries printed images such as those generated via a printing process, into a dynamic programmable full height sectional sign assembly for roadside or building signage use. In this regard, the electronic sign may be programmed to display content that is optimal for the hour of the day or for the day of the week by the simple electronic transmission of a desired image to the sign formed by the application of the modification kit 2 to an existing static billboard sign. For the reasons provided herein, the upgrading an existing static billboard sign into a dynamic programmable electronic sign is therefore highly desired.

Considering now the exemplary modification or retrofit kit 2 in greater detail with reference to FIG. 1, the modification kit 2 generally includes a frame section kit 3, a power kit 6, and an installation kit 8. In an exemplary embodiment the modification kit 2 is self-contained although it is possible that portions of modification kit 2 may be provided separately to a site at which an existing static billboard sign is to be converted to an electronic display. It should be noted that the modification kit 2 may contain some or all of the elements depicted in FIG. 1 and may contain additional elements not depicted. Each of the component elements of the modification kit 2 will now be considered in greater detail.

Sectional Sign Assemblies

The frame section kit 3, generally includes at least one sectional sign assembly 4 having a predetermined number N of frame sections, such as a frame section 10, and a predetermined number n of LED display modules, such as a LED display module 12. The number N of frame sections 10 collectively define an array width for the electronic sign. In this regard, it should be understood that the modification kit 2 may contain one or more frame sections, where the exact number N of frame sections 10 is or will be determined by the width of an existing static billboard or signage mounting structure that will be modified using the modification kit 2. In a similar manner, the predetermined number n of LED display modules is or will be determined by the predetermined number N of frame sections 10 which are provided in the modification kit 2 as will be explained hereinafter in greater detail.

The static billboard modification kit 2 is configured in a customized manner determined by the location of the existing static billboard being converted or retrofitted, including the accessibility of that location by conventional transportation entities. In this regard, in a first embodiment of the modification kit 2, the frame sections 10 and LED display modules 12 are packaged on separate pallets and shipped to the on-site location either together or separately.

In a second embodiment, some of the LED display modules 12 are pre-installed in frame sections 10 so that this installation processes is accomplished in a factory setting as opposed to an in-field setting making conversion and installation easier, faster and more efficient. In this embodiment, some of the LED display modules 12 are shipped uninstalled allowing for their in-filed installation as dictated by the overall signage configuration.

In a third embodiment, all of the LED display modules 12 are pre-installed in their respective frame sections 10 allowing fully loaded frame sections to be shipped and installed when they arrive at an on-site location. In short, field installation in this embodiment does not include the task of installing individual ones of the LED display modules into their respective frame sections 10.

In a fourth embodiment, as will be explained hereinafter in greater detail, frame sections 10 are shipped in a pre-wired configuration to facilitate ease in coupling the frame sections 10 to an available source of AC power.

In summary then, the manner in which the modification kit 2 is configured and shipped to an on-site location is dependent upon the location of the static billboard sign being converted, installation considerations as well as the ease and availability of various shipping methods depending upon the size of the sign being converted.

Led Display Modules

The LED display modules of the present invention, such as the LED display module 12; if being installed in an outdoor environment is weatherized. In this regard, each LED display module 12 is highly water resistant and requires little, if any, water protection that would be otherwise provided by the frame sections 10. Each individual one of the LED display modules 12 can be weatherized through the use of one or more of waterproof gaskets, potting adhesives such as epoxies, and over molded portions.

Power Kit

Figure 3:
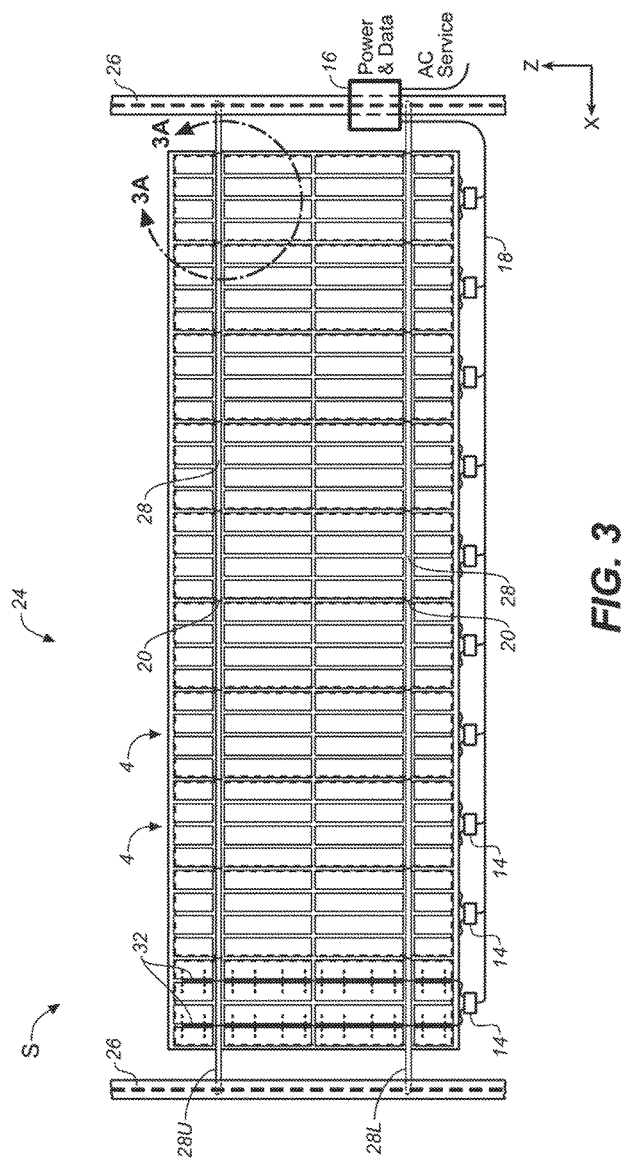
FIG. 3 is a simplified rear view of the first embodiment of electronic sign of FIG. 2.

As already noted, in certain embodiments of the present invention, frame sections, such as the frame section 10 are shipped pre-wired to take advantage of factory pre-assembly processes. In other situations, depending upon whether the static billboard was or was not provided with electrical power, it may be more advantageous to provide the modification kit 2 with a power kit 6 as best seen in FIG. 1. In this case the power kit 6, forming part of the modification kit 2 generally includes one or more AC/DC power/data hubs, indicated generally at 14, one or more power and data enclosures 16, and sufficient AC wiring 18 for routing power from the main power enclosures 16 to the individual hubs 14. In an exemplary embodiment as best seen in FIG. 3, each main power and data enclosure 16 couples to external AC line power and to an external data link. The AC wiring 18 can be for coupling data and AC power from the main power and data enclosure 16 to the individual hubs 14. There can be a hub 14 for each frame section 10. Each hub 14 receives AC power and data from the main enclosure 16. Each hub 14 is provided for rectifying the AC power and for delivering the rectified DC power and the data to a single frame section 10.

Other designs are possible. For example, in an alternative embodiment power may be rectified at the main power and data enclosure 16. Then each hub 14 can be for receiving DC power and data to be delivered to its respective frame section 10.

In another embodiment the circuitry of each hub 14 is integrated into a sectional assembly frame section 10. Then AC line power in this configuration can then be coupled directly to each sectional assembly frame section 10.

Installation Kit

Figure 7:
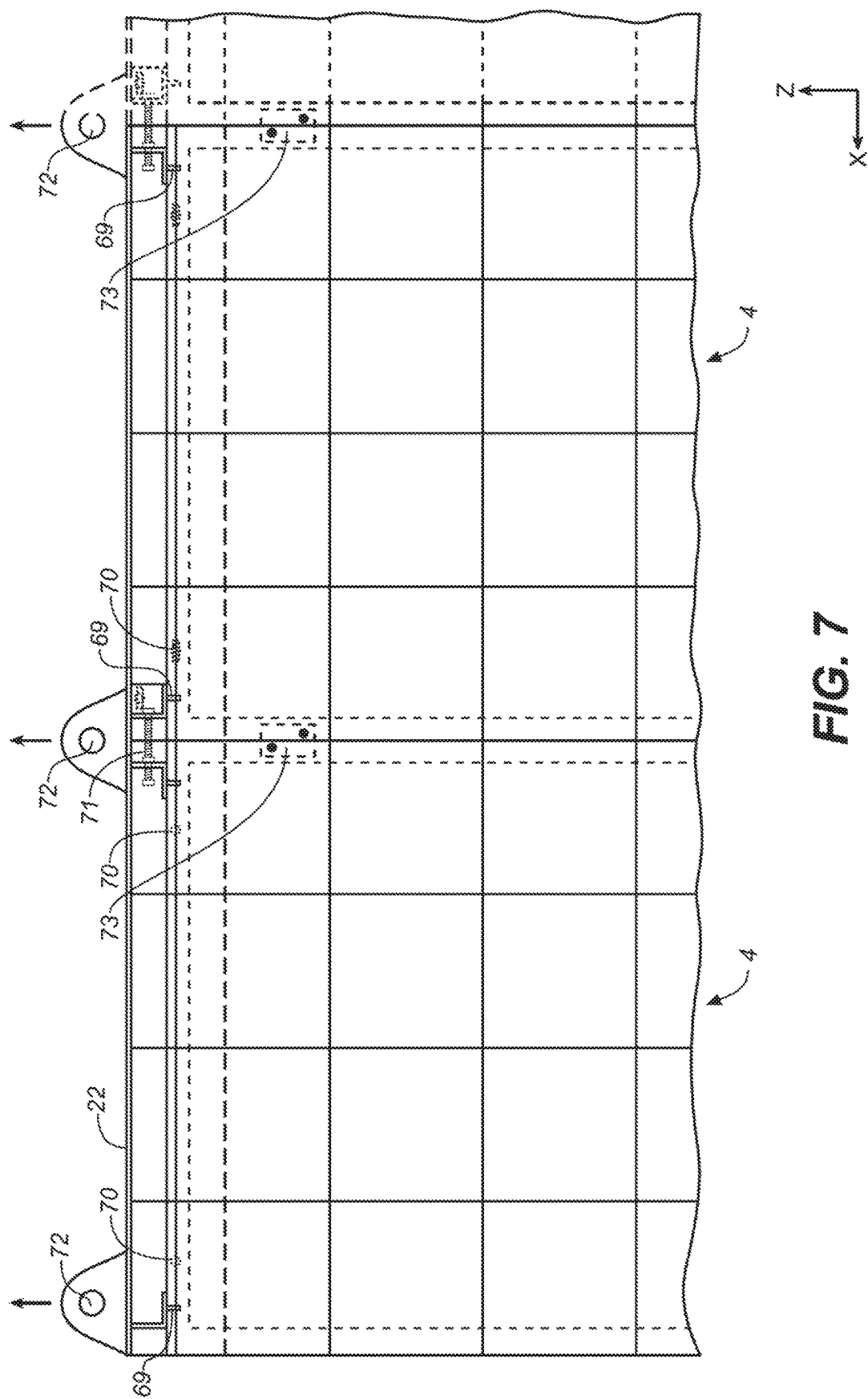
FIG. 7 depicts a coupling mechanism for aligning and lifting two or more sectional assemblies onto an existing signage mounting structure.

Depending upon the number of frame sections 10 to be utilized in a conversion process or retrofit project, the modification kit 2 may further include an installation kit 8. The installation kit 8 helps in field conversion by facilitating coupling frame sections together for mounting to a pre-existing static sign mounting structure. In this regard, as best seen in FIG. 1, each installation kit 8 forming part of the modification kit 2 generally includes a set of mounting brackets, such as a mounting bracket 20, as best seen in FIGS. 9 and 9A and lifting and datum hardware 22 as best seen in FIG. 7. Mounting brackets 20 are provided for coupling each frame section 10 to an existing signage mounting structure S. In addition to mechanical coupling and support, mounting brackets 20 provide compensation for non-planarity of an existing signage structure S. Lifting and datum hardware 22 provides a way of aligning the frame sections with respect to each other and for facilitating lifting one section 10 or a group of sections 10 up and onto the existing signage mounting structure as best seen in FIGS. 9 and 9A.

As noted earlier, variations for the modification kit 2 are possible. For example, a hub 14 may be integrated into each frame section 10 rather than having hub 14 as a separate portion of a modification kit 2. Mounting brackets 20 or lifting and datum hardware 22 or portions thereof may also be integrated into each of frame sections 10. Additionally, modification kit 2 may include other hardware and tools.

Figure 2:
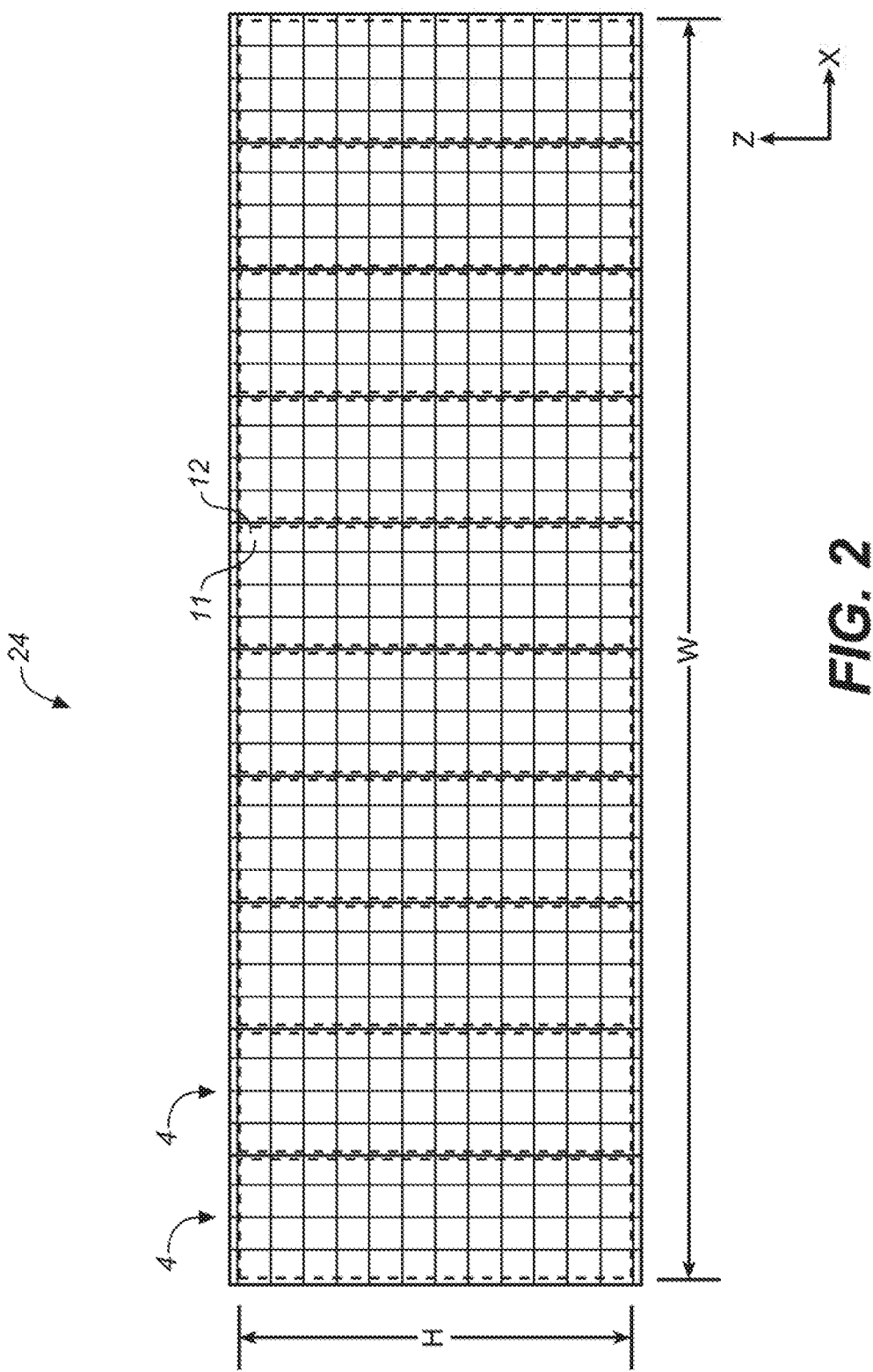
FIG. 2 is a simplified front view of a first embodiment of an electronic sign formed by application of the modification kit of FIG. 1 to an existing signage mounting structure of a static billboard sign.

As noted earlier, by application of the modification kit 2 to an existing signage structure S, a static poster panel sign for carrying printed images is modified into a dynamic electronic sign 24, which hereinafter will also be referred to as a converted sign 24. In this regard, FIG. 2 depicts a simplified front view of a first embodiment of such an electronic sign 24 illustrating for simplicity only the sectional sign assemblies 4. In this embodiment, the retrofit kit 2 utilized on the billboard sign S included ten sectional sign assemblies 4, where each sectional sign assembly includes or is configured for holding an array of forty-eight LED display modules 12 and where each individual LED display module 12 is received within a bay 11. In this exemplary embodiment each LED display module 12 includes a square array of emissive LED pixels that is approximately 14 inches by 14 inches in size. Each sectional sign assembly 4 is four LED display modules 12 wide and twelve LED display modules 12 in height. The width dimension W of the sign 24 is indicated by the illustrated X-axis and the height dimension H of the sign is illustrated by the Z-axis.

According to the illustrated embodiment of FIG. 2, each sectional sign assembly 4 defines the full illuminated height H of the sign 24, but only a fractional portion of the full illuminated width W of the sign 24. In this arrangement therefore, a plurality of aligned sectional sign assemblies 4, in a side-by-side arrangement, define the full illuminated width W of sign 24. In this illustrated embodiment, the full illuminated height H of the sign 24 is about 14 feet and the full illuminated width W of the sign 24 is about 46.7 feet. Of course the dimensions W and H are exemplary and illustrative of one large embodiment for converted sign 24.

FIG. 3 is a simplified rear view of the first embodiment converted electronic sign 24. According to this illustrative embodiment, a previous static billboard or poster panel sign structure S included two vertical poles 26 coupled to two horizontal beams 28 which, during the retrofitting process, are utilized with the installation kit 8 for supporting the other component parts of the modification kit 2, namely the sectional sign assemblies 4 and power kit 6 for forming the converted sign 24. In this first embodiment of the converted sign 24, each of the sectional assemblies 4 are mounted to two or more horizontal beams 28 via mounting brackets 20, as best seen in FIGS. 3A, 9 and 9A.

Also depicted in FIG. 3 is the main power and data enclosure 16 of power kit 6, which is shown mounted to one of the vertical poles 26. The main power and data enclosure 16 receives the primary AC power service and data lines and couples the AC power and data to each of the AC/DC power/data hubs 14 via wiring 18. In this embodiment there is one power and data hub 14 for each sectional assembly 4. Each power and data hub 14 rectifies the AC power coupled from enclosure 16 into low voltage DC power, and provides both the low voltage DC power and data to each of the LED display modules 12 in the sectional sign assembly 4 via a wiring harness or power routing system 32. It should be understood by those skilled in the art that in an alternative embodiment, there can be provided a wireless link between the enclosure 16 and each of the hubs 14 to enable the data to be delivered or coupled wirelessly from enclosure 16 to each of the hubs 14.

FIG. 3A depicts a portion of FIG. 3 in greater detail to illustrate various features of the modification kit 2. In this regard, FIG. 3A illustrates only a portion of two sectional sign assemblies 4 showing how the individual mounting brackets 20 couple the sectional sign assembly 4 to the horizontal beam 28. FIG. 3A also depicted that each sectional sign assembly 4 is provided with a rear access doors 34 which allows removal and replacement of the LED display modules 12 from the rear side of converted electronic sign 24. It should therefore be understood by those skilled in the art, that in this first embodiment the individual LED display modules 12 mounted within the sectional sign assemblies 4 can be removed and replaced from either the front side (depicted in FIG. 2) or the rear side (FIG. 3) of sign 24.

Figure 4:
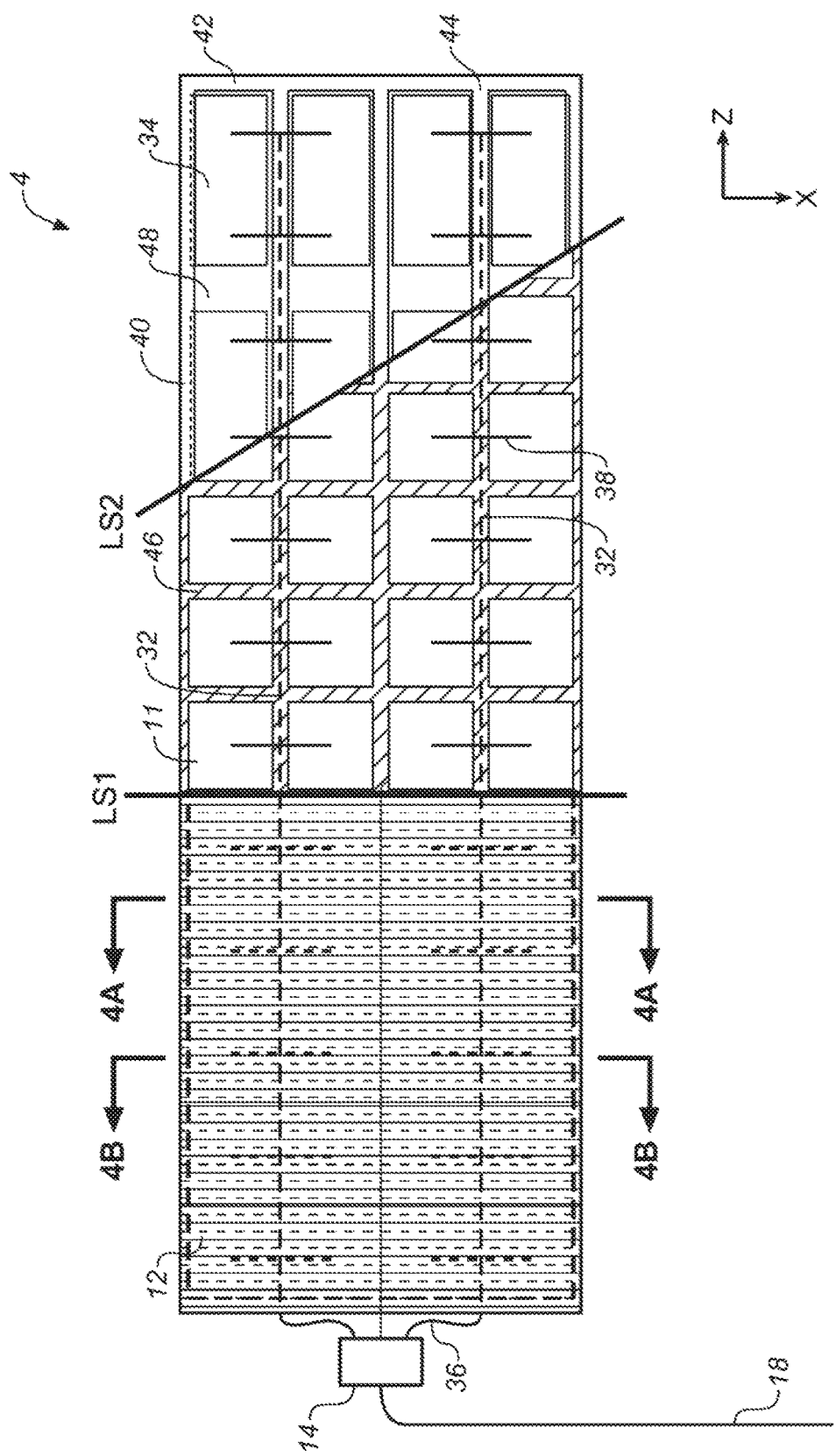
FIG. 4 is a layered elevation view of a single sectional sign assembly forming part of the modification kit of FIG. 1.

Considering the modification kit 2 in still greater detail with reference to FIG. 4, a single sectional assembly 4 is shown in a layered elevation view. The layering is indicated by the designators LS1 (layer step 1) and LS2 (layer step 2). The portion of the sectional assembly 4 that is to the left of LS1 includes 20 LED modules that are installed in sectional assembly 4. The portion of the sectional assembly 4 that is between LS1 and LS2 includes bays 11 which do not contain LED display modules 12. Each bay 11 is configured to receive one LED display module 12. The bays 11 are in part defined by a front sheet metal layer 46. The portion of the sectional sign assembly 4 that is to the right of LS2 is shown with the front sheet metal layer 46 removed for illustrating a rear sheet metal layer 48 and the rear access doors 34.

Sectional sign assembly 4 has its major or height dimension defined along the vertical Z-axis as best seen in FIG. 4. The sectional sign assembly 4 also has its intermediate or width dimension defined along the horizontal X-axis, and its minor or depth dimension defined along the horizontal Y-axis. In an exemplary embodiment the height dimension can be in a range of about 8 feet to about 14 feet. In an exemplary embodiment the width dimension can be in a range of about 2 feet to about 5 feet. In an exemplary embodiment the depth dimension is less than about 1 foot or more preferably less than about 6 inches.

Figure 4A:
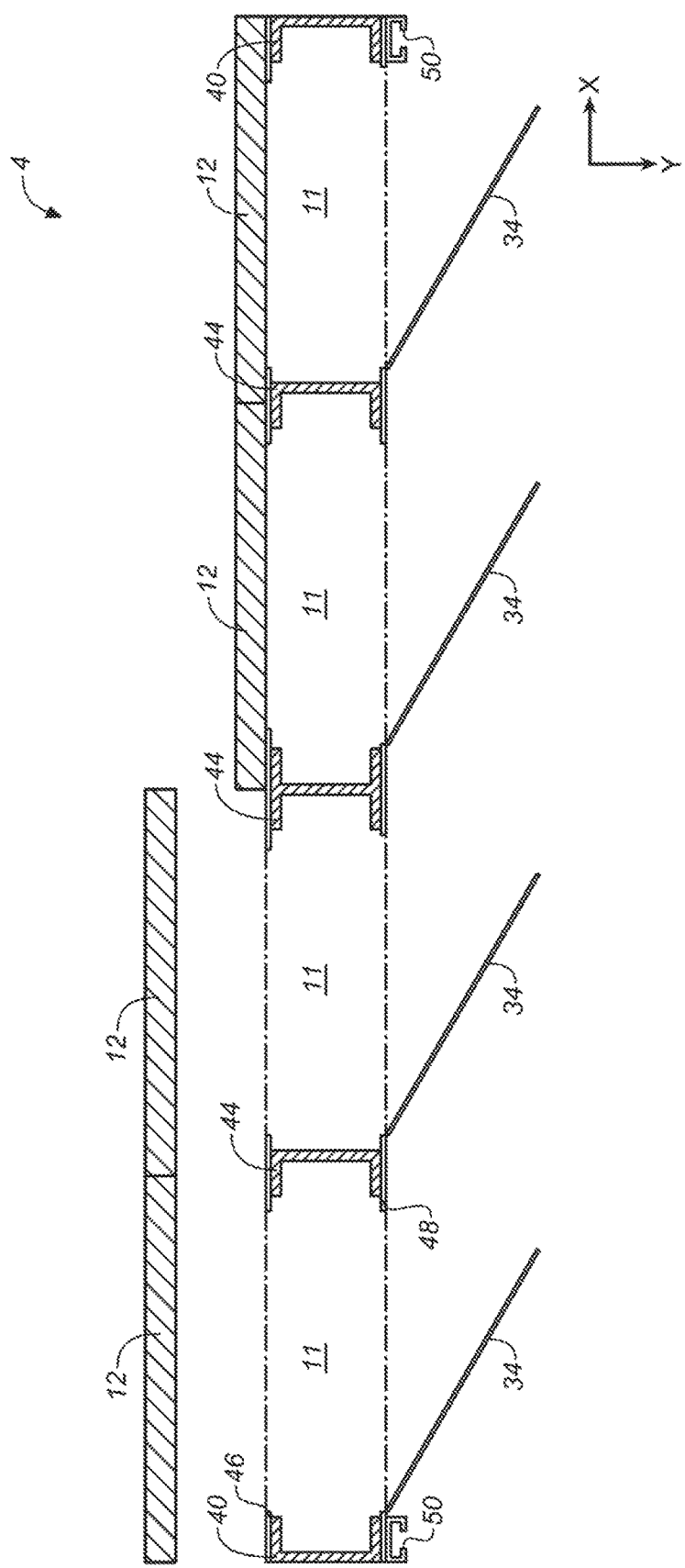
FIG. 4A is a cross-sectional view of the sectional sign assembly of FIG. 4 taken substantially along section line A-A.
Figure 4B:
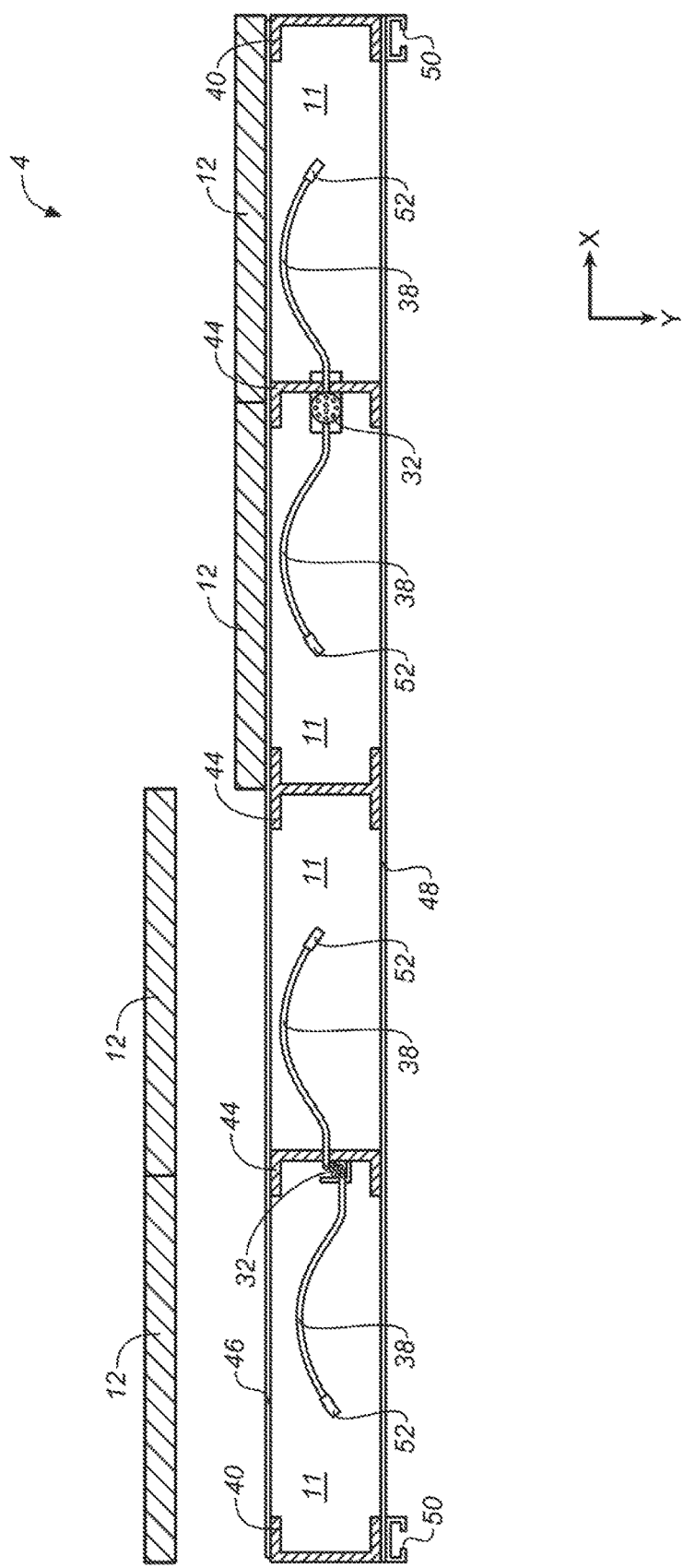
FIG. 4B is a cross-sectional view of the sectional sign assembly of FIG. 4 taken substantially along section line B-B.

Considering now the AC/DC power and data hub 14 in greater detail with reference to FIGS. 4, 4A and 4B, the power and data hub 14 receives AC power and data via wiring 18 which is provided between the main power and data enclosure 16 and each hub 14. The power and data hub 14 rectifies the supplied AC power to low voltage DC power and then couples the low voltage DC power and data, via two wiring harnesses 32 to the individual bays 11. The two wiring harnesses 32 are prewired in the sectional sign assemblies 4. As best seen in FIG. 4, each wiring harness 32 has an input end 36 coupled to hub 14 and a plurality of output ends 38 that are each disposed in one of the bays 11. Each wiring harness 32 is routed vertically along vertical axis Z or along the length dimension of the sectional sign assembly 4. Individual output ends 38 emerge and branch out from wiring harness 32 and each individual output end 38 extends generally horizontally along axis X into each bay 11.

Considering the wiring harness 32 in still greater detail with reference to FIGS. 4, 4A and 4B, the sectional sign assembly 4 includes a framework of outer vertical beams 40, outer horizontal beams 42, and internal vertical beams 44. The framework of beams 40, 42, 44 provides mechanical strength of sectional assembly 4. Also, some internal vertical beams 44 can facilitate the vertical routing of wiring harnesses 32 which follow along two such internal vertical beams 44 that pass between pairs of bays 11 as best seen in FIG. 4B.

FIG. 4A depicts a cross-section view of sectional sign assembly 4 taken through section A-A of FIG. 4. The axis Y is along a depth axis relative to sectional assembly 4. Sectional assembly 4 includes outer vertical beams 40 and internal vertical beams 44. The framework provided by beams 40 and 44 support front sheeting 46 and rear sheeting 48. Attached to the outer vertical beams 40 are channels 50 which facilitate mounting of sectional assembly 4 to horizontal beams 28 (see FIGS. 3 and 3A). Two LED display modules 12 are shown about to be installed into bays 11 (left side of FIG. 4A) and two LED modules 12 are shown already installed into bays 11. Access doors 34 are shown open that allow rear removal and replacement of LED display modules 12. In the design as depicted the LED modules 12 can be installed from a front or rear surface of sectional assembly 4.

FIG. 4B depicts a cross-section view taken through section B-B of FIG. 4. Sectional assembly 4 includes outer vertical beams 40, internal vertical beams 44, front sheeting 46, rear sheeting 48, vertical channels 50, and LED modules 12 (two waiting to be installed and two installed).

Two of the vertical internal beams 44 provide support for wiring harnesses 32 passing vertically (along the Z-axis) between pairs of bays 11. The support can be in the form of a C-channel, metal conduit, or a series of holes for using cable ties just to mention a few examples. For each wiring harness 32 there are pairs of output ends 38 that extend along opposing directions into adjacent bays 11. Each output end 38 includes a connector 52 for coupling harness 32 to an LED module 12 assembled into its associated bay 11.

In an exemplary embodiment the main structural components of sectional assembly 4 are formed from aluminum in order to minimize weight. The beams 40, 42, and 44 can all be formed from extruded and/or rolled aluminum. The sheeting 46 and 48 can be aluminum sheet metal. In other embodiments some or all of the beams 40, 42, and 44 can be formed from extruded steel, other metals, composite materials or other high strength materials. In yet other embodiments the sheeting 46 and/or sheeting 48 can be formed from other materials such as passivated stainless steel, epoxy coated steel or plastic to mention a few examples.

Figure 5:
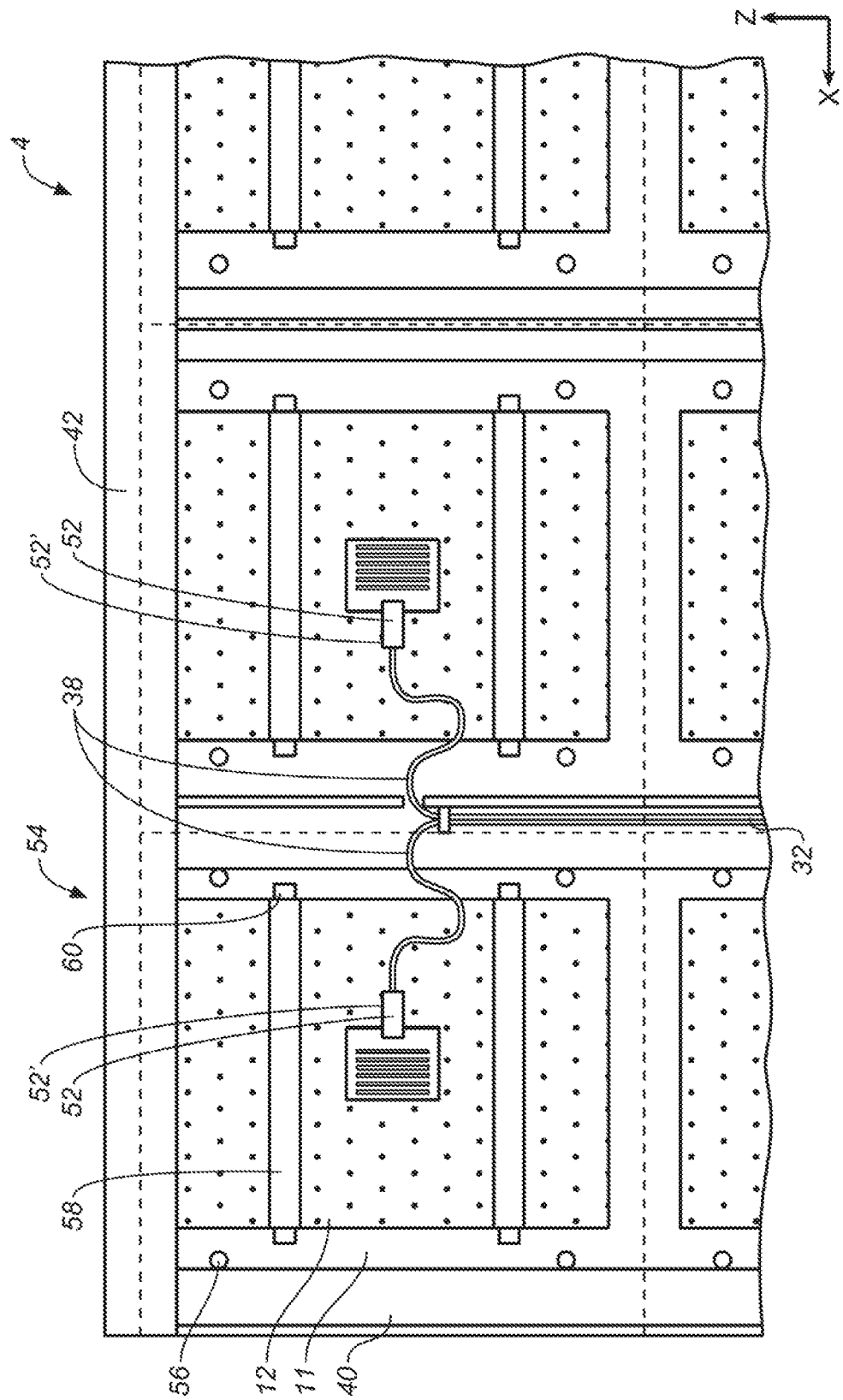
FIG. 5 is a rear elevation view of another single sectional sign assembly forming part of the modification kit of FIG. 1, illustrated with installed LED display modules also forming part of the modification kit of FIG. 1.

Considering now the LED display module 12 and the bay 11 in which it is received in greater detail with reference to FIG. 5, an interface 54 is provided between each LED display module 12 and its respective bay 11. The interface 54 between LED display module 12 and bay 11 provides alignment, latching, a power connection, and a data connection. More specifically, the interface 54 includes alignment feature 56 such as complementary pin and openings that engage to align LED display module 12 to bay 11. The alignment feature 56 can be implemented as a pin on LED display module 12 that engages an opening on bay 11 or a pin in bay 11 that engages an opening on LED display module 12. Other types of alignment features are possible, such as a ball and notch alignment combination (not shown).

In the illustrative embodiment as best seen in FIG. 5, the LED display module 12 includes a latch mechanism 58 that extends horizontally along the X-axis to engage openings in bay 11 with latches 60. In an alternative embodiment bay 11 may include a latch to engage openings (not shown) in LED display module 12.

A portion of wiring harness 32 is shown that extends vertically along the Z-axis between a pair of bays 11 from which two output ends 38 branch along approximately opposing directions to connectors 52. In an exemplary embodiment wiring harness 32 is a power and data harness. Connector 52 is a power and data connector 52 that enables simultaneous power and data connection from harness 32 to LED module 12 by pressing connector 52 onto a complementary connector 52' (under connector 52) that is integrated into LED module 12. In an exemplary embodiment the connector pair 52 and 52' is a pin and socket pair. One of the connector pair 52 and 52' is a connector pin array (52 or 52') and the other is a corresponding connector socket array (52 or 52') for receiving the connector pin array. Each connector pin (not shown) either transfers data or power or is a ground connection between harness 32 and LED module 12.

Figure 6:
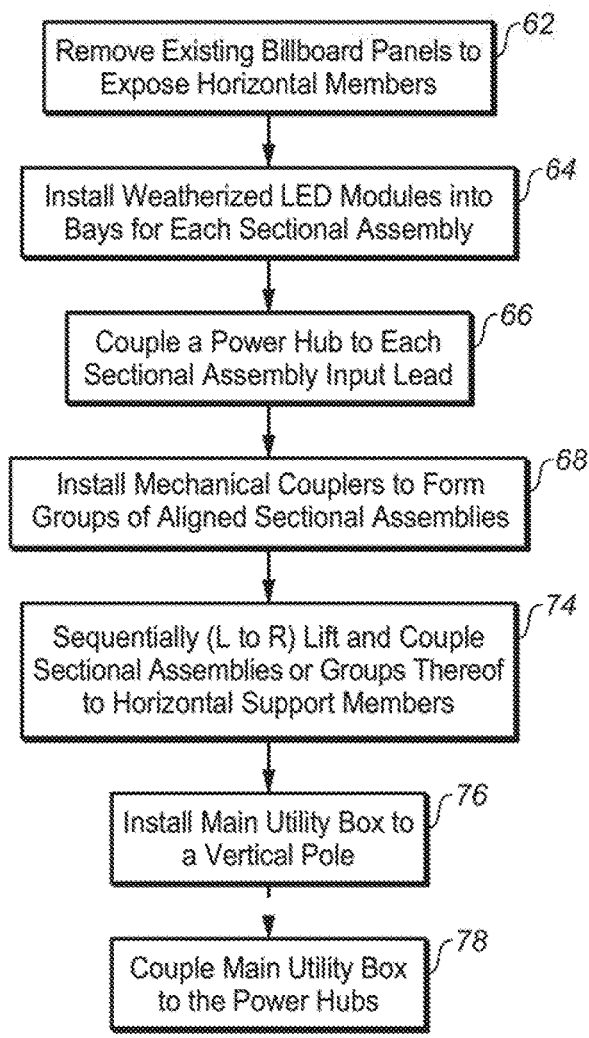
FIG. 6 is a flow chart representation of a method of using the modification kit of in FIG. 1, to retrofit a static billboard sign into a digital electronic sign in accordance with the present invention.

FIG. 6 depicts an illustrative method of retrofitting a static billboard to a digital sign. Some details have been left out for illustrative simplicity. Some steps may not be necessary or may alter in their sequence depending on a particular embodiment.

The retrofit method begins with an existing static billboard sign. According to step 62 the billboard panel is removed and horizontal beams 28 are exposed (See FIG. 3). Poles 26 supporting horizontal beams 28 are the main structural support and poles 26 together with beams 28 define the existing signage mounting structure.

According to step 64 a weatherized LED module 12 is installed into each bay 11. Step 64 may not be necessary if the LED modules 12 are factory preinstalled before the retrofit process. Alternatively LED modules 12 can be installed into bays 11 as a later procedure that follows any of steps 66-78 of FIG. 6.

According to step 66 a power hub 14 is attached to each sectional assembly 4. As an alternative method, power hub 4 can be attached as a later step after any of steps 68-76. Input end 36 of wiring harness 32 is electrically coupled to power hub 4.

According to step 68 mechanical couplers 22 are attached to groups of two or more sectional assemblies 4. This is illustrated in FIG. 7 which shows a mechanical coupler 22 that is attached to at least three sectional assemblies 4. In an exemplary embodiment the mechanical coupler 22 is attached to four such sectional assemblies 4 to allow four sectional assemblies 4 to be aligned and hoisted at the same time.

Mechanical coupler 22 includes constraining features 69 and 70 to constrain motion of sectional assemblies 4 with respect to the X and Y axes. Each constraining feature 69 includes a pin extending from coupler 22 that engages an opening in the top horizontal beam 42 of a sectional assembly 4 to provide a datum function. Each constraining feature 70 is a bolt attachment having a dual function of constraining motion and also coupling coupler 22 to sectional assembly 4. Coupler 22 includes a threaded rod 71 that allows the position of pairs of sectional assemblies 4 to be adjusted along the X-axis. Some of the constraining features 70 provide constraint in Z and Y but allow for motion along X to allow action of the threaded rod 71.

Also providing motion constraint are datum plates 73 that constrain motion between sectional assemblies 4 with respect to the Z-axis as well as constraining rotation about the Y-axis. Datum plates 73 can be part of installation kit 8 (FIG. 1) and are preferably installed prior to lifting groups of sectional assemblies onto horizontal beams 28.

Thus groups of sectional assemblies 4 are placed in alignment through the attachment of mechanical coupler 22. Mechanical coupler 22 also includes lifting features 72 that allow hooks of a crane to lift mechanical coupler 22 thereby lifting an aligned group of sectional assemblies 4 in one lifting or hoisting step.

According to step 74 sectional assemblies 4 (or groups thereof using mechanical couplers 22) are sequentially lifted and coupled to horizontal support members 28 (see FIG. 3). This includes alignment of all the sectional assemblies 4 with respect to each other which can be accomplished via mechanical couplers and/or other means.

According to step 76 a main utility box 16 is attached to pole 26 (see FIG. 3). According to step 78 the main utility box 16 is electrically coupled to each of the hubs 14 utilizing wiring 18. As indicated earlier other orderings of steps are possible. For example, attaching the main utility box 16 can be performed earlier in the process such as between steps 62 and 64.

Figure 8:
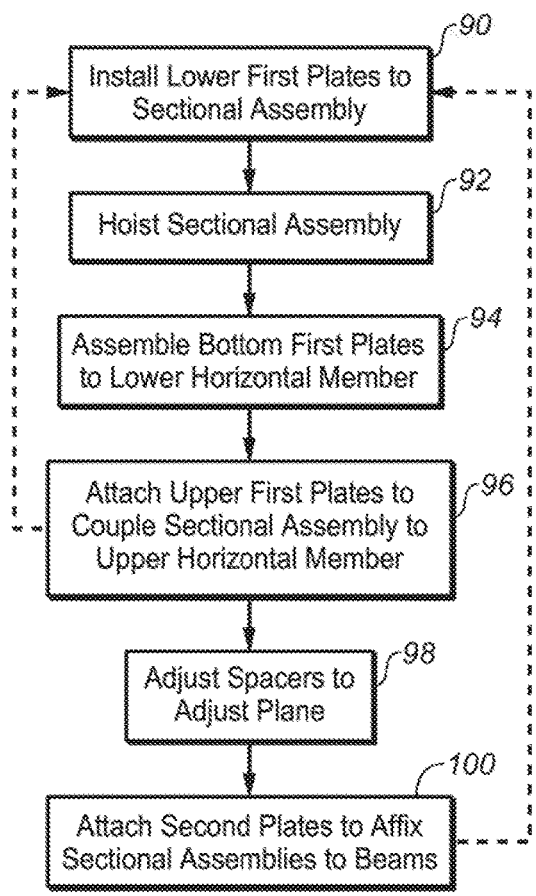
FIG. 8 is a flow chart representation depicting a method of installing a sectional sign assembly to an existing signage mounting structure of a static billboard sign using a set of mounting brackets forming part of the modification kit of FIG. 1.

One difficulty with retrofitting signs is a lack of planarity of the supporting structure defined by poles 26 and horizontal beams 28. To address this difficulty the method of FIG. 8 is utilized. The method of FIG. 8 involves the apparatus of claim 9 and can be incorporated into the method depicted by FIG. 6. It is here being described separately for simplicity and better illustration.

FIG. 9 depicts sectional assembly 4 attached to horizontal beam 28 via mounting bracket 20. Mounting bracket 20 is configured to provide a secure planar orientation of sectional assembly 4 even when horizontal beams 28 are not perfectly parallel or defining a perfect line. Thus if beams 28 are non-linear (e.g., curved) or skewed relative to one another the mounting bracket 20 can compensate to a reasonable degree.

FIG. 9A is a detail view taken from FIG. 9 to illustrate certain functional components of mounting bracket 20. Mounting bracket 20 includes first plate 80, adjustable spacer 82, and second plate 84. First plate 80 is attached to channel 50 via channel nuts 86. First plate 80 includes a slot 88 that captures an upper portion of beam 28 to support sectional assembly 4 upon beam 28. The slot 88 has a depth dimension along the Y-axis that allows for positional adjustments of sectional assembly 4 with along the depth dimension Y. Adjustable spacer 82 is utilized to adjust the planar orientation of sectional assembly 4. Finally the second plate 84 is utilized to lock or restrain the position of first plate 80 with respect to beam 28 once adjustments have been made. Thus the mounting bracket has functions that include support, dimensional compensation, dimensional adjustment, and mechanical locking.

Referring back to FIG. 8 a method of mounting one or more sectional assemblies 4 to horizontal beams 28 is depicted. Referring back to FIG. 3 horizontal beams can include an upper beam 28U and lower beam 28L. The description of FIG. 8 will refer to the assembly of a sectional assembly 4 to beams 28 but it is to be understood that an exemplary embodiment concerns assembling more than one sectional assembly 4 at a time by employing mechanical coupler 22. In an exemplary embodiment mechanical coupler 22 attaches to four such sectional assemblies 4 which are mounted to the horizontal beams as a mechanically coupled group of sectional assemblies 4.

According to step 90 lower first plates 80 corresponding to the lower beam 28L are assembled to sectional assemblies 4. As shown in FIG. 3A there can be two mounting brackets 20 (which each include a first plate 80) attached to each sectional assembly 4. According to step 92 a sectional assembly 4 (or group of sectional assemblies) is hoisted or raised.

According to step 94 the lower first plates 80 are configured relative t lower beam 28L whereby slot 88 captures the top of beam 28L (see FIG. 9A). According to step 96 the upper first plates 80 are then attached to couple the sectional assembly 4 to upper beam 28U. Thus upper and lower beams 28 are captured by slots 88 which allow for planarity adjustments.

According to step 98 the spacers 82 are adjusted to properly orient sectional assembly 4. As of step 98 all of the sectional assemblies 4 may be already assembled to beams 28 to allow for planarity adjustments of all the sectional assemblies at once. Alternatively the adjustment can be made on one sectional assembly (or mechanically coupled groups thereof) at step 98.

After step 98 the second plates 84 are tightened into place which locks the planarity adjustment of sectional assembly 4. As indicated by the dashed arrows in FIG. 8, there are variations possible in terms of the sequence of steps depending on the preference of the assembly crews. Planarity of the sectional assemblies can be adjusted and fixed when they are all assembled to beams 28 or they can be adjusted and fixed one at a time. In yet another embodiment a coarse adjustment can be performed each time a sectional assembly is raised and then a fine adjustment can be performed after all are assembled to beams 28. Although FIG. 8 describes mounting a sectional assembly 4 to two horizontal beams 28 it is to be understood that an existing signage mounting structure will typically have two or more such horizontal beams 28. Some existing mounting structures will have 3 or 4 such horizontal beams 28. In this case step 96 will include mounting the first plates 80 for mounting to all of the horizontal beams 28 that are above the lower horizontal beam 28L.

Figure 10:
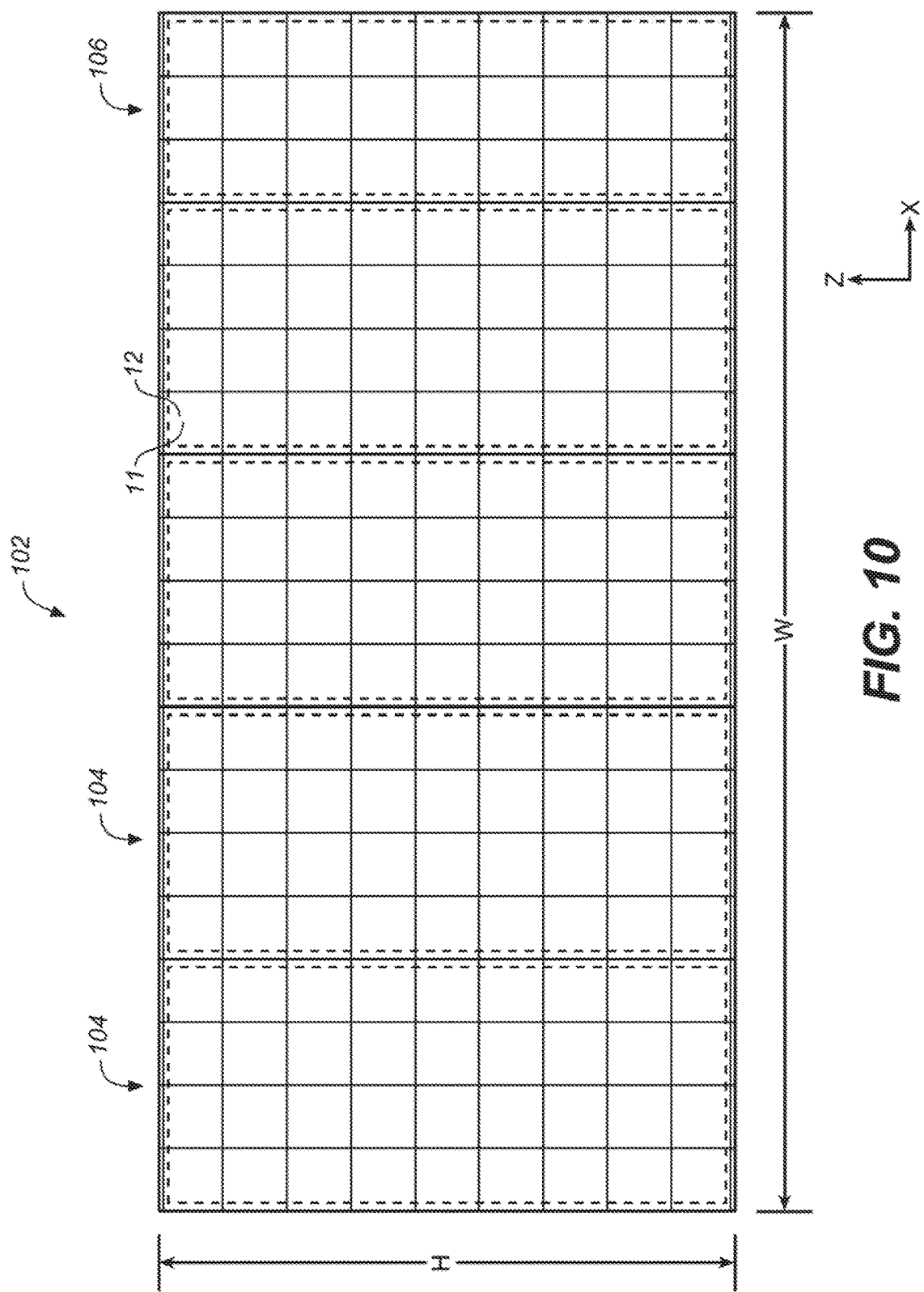
FIG. 10 is a front view of a second embodiment of an electronic sign formed by application of the modification kit of FIG. 1 to an existing signage mounting structure of a static billboard sign.

FIG. 10 depicts a simplified front view of an embodiment of an electronic sign 102. Sign 102 results when a static billboard sign is retrofitted with an embodiment of kit 2. Sign 102 differs from sign 24 of FIG. 2 in that it is a smaller sign that utilizes a combination of four sectional assemblies 104 that are four LED modules wide and one sectional assembly 106 that is three LED modules wide. Each of the sectional assemblies 104 are four modules wide in X and 9 modules high in Z. The sectional assembly 106 is three modules wide in X and 9 modules wide in height. The illuminated portion of sign 102 has a height H of about 10.5 feet as measured along the Z-axis and a width W of about 21 feet as measured along the X-axis.

Internal design characteristics of the sectional assemblies 104 can be similar to the earlier-described sectional assemblies 4 with respect to features such as routing of the wiring harness 32, power and data hubs 14, and the interface 54 between each LED module 12 and its respective receiving bay 11. In that regard sectional assemblies 104 and 106 are each exemplary embodiments of sectional assemblies 4 of FIG. 1. The sectional assembly 106 would have one or two wiring harnesses 32 and a hub 14 configured for supporting an array of 27 LED modules 12. As can be seen, sectional assemblies 4 can take on a range of form factors of LED modules to support retrofitting a wide variety of static billboard supports.

While the present disclosure has described a process for mounting one or more sectional sign assemblies to the horizontal supports of an existing sign structure, the mounting of such a sign section assembly is not limited to one particular mounting structure. According to the present invention, "an existing sign structure" or "an existing signage mounting structure" can include portions of or one or more of vertical beams, horizontal beams, diagonal beams, sheet metal panels, a sheet metal panelized system, a structural steel grid, a lattice structure of any appropriate ridged material, such as steel, structural foam, and plastic for example, a spaceframe, a billboard structure, architectural cladding, sign cabinet framing, a framed walling, a concrete walling, a planar surface. These are but a few of the surfaces that may be included as part of an existing signage mounting structure. Thus, there is no intention of limiting the scope of the type of surfaces and structures that can be modified to become a dynamic electronic sign or billboard.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. For example, rather than having a frame section assembly constructed of individual horizontal and vertical beams, each frame section may have a unitary construction composed of structural foam. Accordingly, other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

The specific embodiments and applications thereof described above are for illustrative purposes only and do not preclude modifications and variations encompassed by the scope of the following claims.

We claim:

1. A modification kit for converting a static billboard to an electronic sign, comprising:
  a static billboard having an existing mounting structure;
  a frame section kit for providing at least one pre-wired frame section to provide a plurality of display modules with low voltage direct current power, and data to display by the electronic sign;

said at least one pre-wired frame section defining a plurality of bay members for receiving therein said plurality of display modules and said at least one pre-wired frame section having a plurality of interfaces disposed between said plurality of bay members and said plurality of display modules to facilitate aligning and latching said plurality of display modules within said plurality of bay members and to facilitate coupling the low voltage direct current power and data to the plurality of display modules, wherein the at least one pre-wired frame section is constructed from a framework of vertical and horizontal beams and an outer sheeting, the framework including an interior beam;

a power kit for providing at least one power data hub and at least one wiring harness having output ends to facilitate rectifying a source of alternating current power distributed from a main power and data enclosure to a source of low voltage direct current power for distribution via said at least one wiring harness and to further facilitate coupling a data link distributed from the main power and data enclosure via said at least one wiring harness to said plurality of display modules through the output ends, wherein the interior beam supports a vertical routing of the at least one wiring harness to facilitate branching the output ends of the at least one wiring harness in a generally vertical direction into each individual one of said plurality of bay members; and an installation kit for providing lifting and alignment hardware to facilitate hoisting, aligning and mounting said at least one pre-wired frame section to the existing mounting structure, wherein the lifting and alignment hardware includes at least one mounting bracket for coupling with compensation for the existing signage mounting structure the at least one pre-wired frame section to the existing signage mounting structure to facilitate frame section alignment purposes, wherein the mounting bracket further includes datum hardware to facilitate frame section to existing signage structure alignment, wherein the datum hardware includes a first plate, an adjustable spacer located adjacent to the first plate, and second plate located adjacent to the first plate for locking or restraining a position of the first plate with respect to the existing signage mounting structure.

2. The modification kit according to claim 1, wherein said pre-wired frame section has secured thereto said at least one power data hub.

3. The modification kit according to claim 1, wherein said pre-wired frame section is pre-loaded with said plurality of display modules.

4. The modification kit according to clam 1, wherein said power kit is for providing power and data wiring to facilitate coupling said data link and said source of alternating current power to said main power and data enclosure.

5. The modification kit according to claim 1, wherein said lifting and alignment hardware includes other datum hardware to facilitate frame section to frame section alignment purposes, wherein the other datum hardware includes a coupler, a pin operatively connected to a portion of the coupler and a portion of the frame section, a fastener operatively connected to another portion of the coupler to allow a position of adjacent frame sections to be adjusted and at least one plate operatively connected between the adjacent frame sections to constrain motion between the adjacent frame sections.

6. The modification kit according to claim 1 wherein said lifting and alignment hardware includes hoisting hardware to provide an interface for a crane to hoist the at least one frame section to the existing signage mounting structure.

7. The modification kit according to claim 1 wherein the at least one pre-wired frame section is constructed from a framework of vertical and horizontal beams and an outer sheeting, the outer sheeting includes a rear sheet having a door for removing and replacing a display module.

8. The modification kit according to claim 1, wherein the at least one pre-wired frame section has a unitary construction.

9. The modification kit according to claim 8, wherein the at least one pre-wired frame section having a unitary construction is constructed of structural foam.

10. The modification kit according to claim 1 wherein at least some of the display modules are preinstalled in at least some of the frame sections.

11. A modification kit for converting an existing signage mounting structure to an electronic sign comprising:
    an existing signage mounting structure;
    a plurality of frame section assemblies each individual assembly having a back facing portion configured to be coupled to the existing signage mounting structure and a front-facing portion including an array of bays, each individual bay having removably mounted therein an LED display module and each individual assembly being prewired with a power routing system, wherein each individual assembly includes a framework of outer vertical beams, outer horizontal beams and internal vertical beams for providing the individual assembly with mechanical strength and each individual assembly further includes an outer sheeting;
    wherein the power routing system includes an input end that branches out to a plurality of output ends, each individual output end being disposed in one of the bays and each configured to directly couple to one of the LED display modules, wherein the interior beams support a vertical routing of the output ends to facilitate branching of the output ends in a generally vertical direction into each individual one of the array of bays;
    a power kit configured to couple the input end of each power routing system to an AC power source; and
    an installation kit configured to facilitate mounting said back-facing portion to the existing signage mounting structure, wherein the installation kit includes at least one mounting bracket for coupling with compensation for the existing signage mounting structure the plurality of frame section assemblies to the existing signage mounting structure to facilitate frame section alignment purposes, wherein the mounting bracket further includes datum hardware to facilitate the alignment of the plurality frame section assemblies with the existing signage structure, wherein the datum hardware includes a first plate, an adjustable spacer located adjacent to the first plate, and second plate located adiacent to the first plate for locking or restraining a position of the first plate with respect to the existing signage mounting structure.

12. The modification kit according to claim 11,
    wherein each bay in said array of bays is further defined by a rear sheeting member and a rear access door; and
    wherein said outer vertical beams and said outer horizontal beams and said internal vertical beams cooperate to support the front sheeting member and the rear sheeting member associated with each individual bay.

13. The modification kit according to claim 12, wherein said rear access door allows rear removal and replacement of the LED display modules from an associated bay; and wherein said front-facing portion of said frame section allows front removal and replacement of the LED display modules from an associated bay.

14. The modification kit according to claim 11 wherein each bay is provided with a pair of latch receiving openings and wherein each LED display module is provided with a latch mechanism that extends horizontally along an X-axis dimension thereof a sufficient distance to engage the latch receiving openings in an associated bay to facilitate removably latching the LED display module within the associated bay.

15. A modification kit for converting a static billboard to an electronic sign, comprising:
- a static billboard having an existing signage mounting structure;
- at least one pre-wired frame section defining a plurality of bay members for receiving therein a plurality of display modules, said at least one pre-wired frame section having a plurality of interfaces disposed between said plurality of bay members and said plurality of display modules to facilitate aligning and latching said plurality of display modules within said plurality of bay members and to facilitate coupling the low voltage direct current power and data to the plurality of display modules, wherein the at least one pre-wired frame section is constructed from a framework of vertical and horizontal beams and an outer sheeting such that the framework includes an interior beam;
- at least one power data hub and at least one wiring harness having output ends to facilitate rectifying a source of alternating current power distributed from a main power and data enclosure to a source of low voltage direct current power for distribution via said at least one wiring harness and to further facilitate coupling a data link distributed from the main power and data enclosure via said at least one wiring harness to said plurality of display modules through the output ends, wherein the interior beam supports a vertical routing of the at least one wiring harness to facilitate branching the output ends of the at least one wiring harness in a generally vertical direction into each individual one of said plurality of bay members; and
- lifting and alignment hardware to facilitate hoisting, aligning and mounting said at least one pre-wired frame section to the existing signage mounting structure, wherein the lifting and alignment hardware includes at least one mounting bracket for coupling with compensation for the existing signage mounting structure the at least one pre-wired frame section to the existing signage mounting structure to facilitate frame section alignment purposes, wherein the lifting and alignment hardware includes other datum hardware to facilitate frame section to existing signage structure alignment purposes, wherein the mounting bracket further includes datum hardware to facilitate frame section to existing signage structure alignment, wherein the datum hardware includes a first plate, an adjustable spacer located adjacent to the first plate, and second plate located adjacent to the first plate for locking or restraining a position of the first plate with respect to the existing signage mounting structure.

* * * * *